US008261461B2

(12) United States Patent
Shimaoka et al.

(10) Patent No.: US 8,261,461 B2
(45) Date of Patent: Sep. 11, 2012

(54) LINEAR GUIDING MECHANISM AND MEASURING DEVICE

(75) Inventors: Atsushi Shimaoka, Kawasaki (JP); Takeshi Yamamoto, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 451 days.

(21) Appl. No.: 12/687,456

(22) Filed: Jan. 14, 2010

(65) Prior Publication Data

US 2010/0180458 A1 Jul. 22, 2010

(30) Foreign Application Priority Data

Jan. 15, 2009 (JP) ................................ 2009-006635

(51) Int. Cl.
*G01B 5/012* (2006.01)

(52) U.S. Cl. ........................................... 33/559; 33/556

(58) Field of Classification Search .................... 33/533, 33/503, 556, 558, 559, 561
See application file for complete search history.

(56) References Cited

U.S. PATENT DOCUMENTS

| | | | | | |
|---|---|---|---|---|---|
| 3,936,946 | A | * | 2/1976 | Ruffner et al. | 33/556 |
| 4,451,988 | A | * | 6/1984 | McMurtry | 33/572 |
| 4,553,332 | A | * | 11/1985 | Golinelli et al. | 33/561 |
| 5,119,568 | A | * | 6/1992 | Vesco et al. | 33/559 |
| 5,129,152 | A | * | 7/1992 | Barr | 33/503 |
| 5,326,982 | A | * | 7/1994 | Wiklund | 250/559.19 |
| 5,524,354 | A | * | 6/1996 | Bartzke et al. | 33/561 |
| 5,623,766 | A | * | 4/1997 | Ruck et al. | 33/561 |
| 5,890,300 | A | * | 4/1999 | Brenner et al. | 33/503 |
| 6,327,789 | B1 | * | 12/2001 | Nishimura et al. | 33/561 |
| 6,438,856 | B1 | * | 8/2002 | Kaczynski | 33/503 |
| 6,886,265 | B2 | * | 5/2005 | Fracheboud et al. | 33/559 |

FOREIGN PATENT DOCUMENTS

| | | |
|---|---|---|
| JP | 2000-019415 | 1/2000 |
| JP | 2001-281374 | 10/2001 |

* cited by examiner

*Primary Examiner* — Christopher Fulton
(74) *Attorney, Agent, or Firm* — Rankin, Hill & Clark LLP

(57) ABSTRACT

A linear guiding mechanism includes a fixed member, a moving member, a first double parallel leaf spring mechanism and a second double parallel leaf spring mechanism arranged between the fixed member and the moving member and configured to movably support the moving member. The first double parallel leaf spring mechanism and the second double parallel leaf spring mechanism are arranged at an angle other than 180° (for example, 90°) about an axis of movement of the moving member.

4 Claims, 8 Drawing Sheets

LINEAR GUIDING MECHANISM AND MEASURING DEVICE

BACKGROUND OF THE INVENTION

1. Field of the Invention

The present invention generally relates to a linear guiding mechanism and a measuring device and, more specifically, to a linear guiding mechanism using a double parallel spring mechanism and a measuring device having the linear guiding mechanism.

2. Description of the Related Art

A double parallel spring mechanism is known as a mechanism configured to linearly guide a moving member.

For example, a mechanism configured to connect a fixed member and the moving member using two pairs (first and second) double parallel springs and to guide the moving member linearly is known (Japanese Unexamined Patent Application Publication No. 2001-281374 and Japanese Unexamined Patent Application Publication No. 2000-19415). In this configuration, a first double parallel spring mechanism and a second double parallel spring mechanism are arranged at an angle of 180° about an axis of movement of the moving member.

Also, as shown in FIG. 7, a linear guiding mechanism in which a fixed member 1 and a moving member 2 are connected by a single double parallel leaf spring mechanism 11A is also known. This double parallel leaf spring mechanism 11A includes an intermediate member 21 arranged between the fixed member 1 and the moving member 2, a pair of first leaf springs 22, and a pair of second leaf springs 23. The first leaf springs 22 connect the fixed member 1 and both ends of the intermediate member 21 and are arranged so as to be parallel to each other and orthogonal to a direction of movement of the moving member 2. The second leaf springs 23 connect an intermediate portion of the intermediate member 21 and both ends of the moving member 2 and are arranged so as to be parallel to each other and orthogonal to the direction of movement of the moving member 2.

In the linear guiding mechanism described above, in order to secure a linearity of the moving member 2, all of leaf springs 22, 23 are required to have the same restoring force. If all of the leaf springs 22, 23 do not have the same restoring force, desirable linearity is not achieved. In order to equalize the restoring force of all the leaf springs 22, 23, it is required to control the structural properties (thickness, length, etc.) of all of the leaf springs 22, 23 are the same.

Unfortunately, it is difficult to equalize the structural properties (thickness, length, etc.) of all of the leaf springs 22, 23 due to variations in accuracy of finishing. Then, as shown in FIG. 8, when the moving member 2 moves linearly, a rotary movement occurs in bending directions of the leaf springs (the directions in which the leaf springs are subjected to bend), so that desirable linearity cannot be obtained. Also, the effect of the variations in accuracy of finishing becomes remarkable as a stroke of movement of the moving member 2 is increased. As a result, the known mechanism cannot support a long stroke movement.

In the linear guiding mechanism in which the two sets of the double parallel spring mechanisms are employed, the first double parallel spring mechanism and the second double parallel spring mechanism are arranged at an angle of 180° about the axis of movement of the moving member. Thus, since the directions in which the leaf springs are subjected to bend matches between the respective double parallel spring mechanisms, the effect of compensating the variations in restoring force is small, and hence the desirable linearity cannot be obtained.

SUMMARY OF THE INVENTION

It is an object of the invention to provide a linear guiding mechanism which is able to secure a desirable linearity over a long stroke while supporting a measuring device.

In accordance with the present invention, a linear guiding mechanism includes a fixed member, a moving member, a first double parallel spring mechanism, and a second double parallel spring mechanism. The first and second double parallel spring mechanisms are arranged between the fixed member and the moving member and configured to movably support the moving member. The first double parallel spring mechanism and the second double parallel spring mechanism are arranged at an angle other than 180° (i.e., a non-180° angle) about an axis of movement of the moving member.

Since the first and second double parallel spring mechanisms are arranged at a non-180° angle about the axis of movement of the moving member, when one of the double parallel spring mechanisms attempts to make a rotary movement in a bending direction of the spring mechanism, a twisting force is applied to the other double parallel spring mechanism. Since the rigidity of the double parallel spring mechanism is higher in a twisting direction than in the bending direction, a bending of one of the double parallel spring mechanisms is restrained by the other double parallel spring mechanism. Therefore, a desirable linearity is secured. Accordingly, the linear guiding mechanism is less affected by variations in accuracy of finishing and, hence supports a long stroke movement.

Preferably, the first double parallel spring mechanism and the second double parallel spring mechanism are each configured of a double parallel leaf spring mechanism including an intermediate member, a pair of first leaf springs, and a pair of second leaf springs. The pair of first leaf springs connects the fixed member and the intermediate member and are arranged so as to be parallel to each other and orthogonal to a direction of movement of the moving member. The pair of second leaf springs connects the intermediate member and the moving member and are arranged so as to be parallel to each other and orthogonal to the direction of movement of the moving member. Further, the first and second leaf springs are arranged such that a direction of the thickness of the first leaf springs and the second leaf springs match the direction of movement of the moving member. In this configuration, since the double parallel spring mechanism includes the leaf springs, manufacture is achieved at a low cost, and an increased stroke length is also supported. Preferably, the first double parallel spring mechanism and the second double parallel spring mechanism are arranged at an angle of 90° about the axis of movement of the moving member.

In this configuration, since the first double parallel spring mechanism and the second double parallel spring mechanism are arranged at an angle of 90° about the axis of movement of the moving member, the bending direction of one of the first and second double parallel spring mechanisms corresponds to the twisting direction of the other of the first and second double parallel spring mechanisms. In other words, a bending direction of the first double parallel spring mechanism corresponds to a twisting direction of the second double parallel spring mechanism and, a bending direction of the second double parallel spring mechanism corresponds to a twisting direction of the first double parallel spring mechanism. Therefore, rotary movement generated due to the variations in restoring force of the leaf springs is restrained with respect to each other, and hence the desirable linearity is obtained.

In accordance with the present invention, a measuring device includes the aforementioned linear guiding mechanism, and a movable member linearly moved by the linear guiding mechanism. The movable member linearly moved by the linear guiding mechanism may be any movable member that constitutes a part of the measuring device and that is required to have linearity. For example, a spindle to which a measured object comes into abutment or a stage on which the measured object is placed is considered to be a suitable movable member.

Since the desirable linearity is secured for the movement of the movable member, the measuring device with a high degree of accuracy is achieved.

DESCRIPTION OF THE PREFERRED EMBODIMENTS

Figure 1:
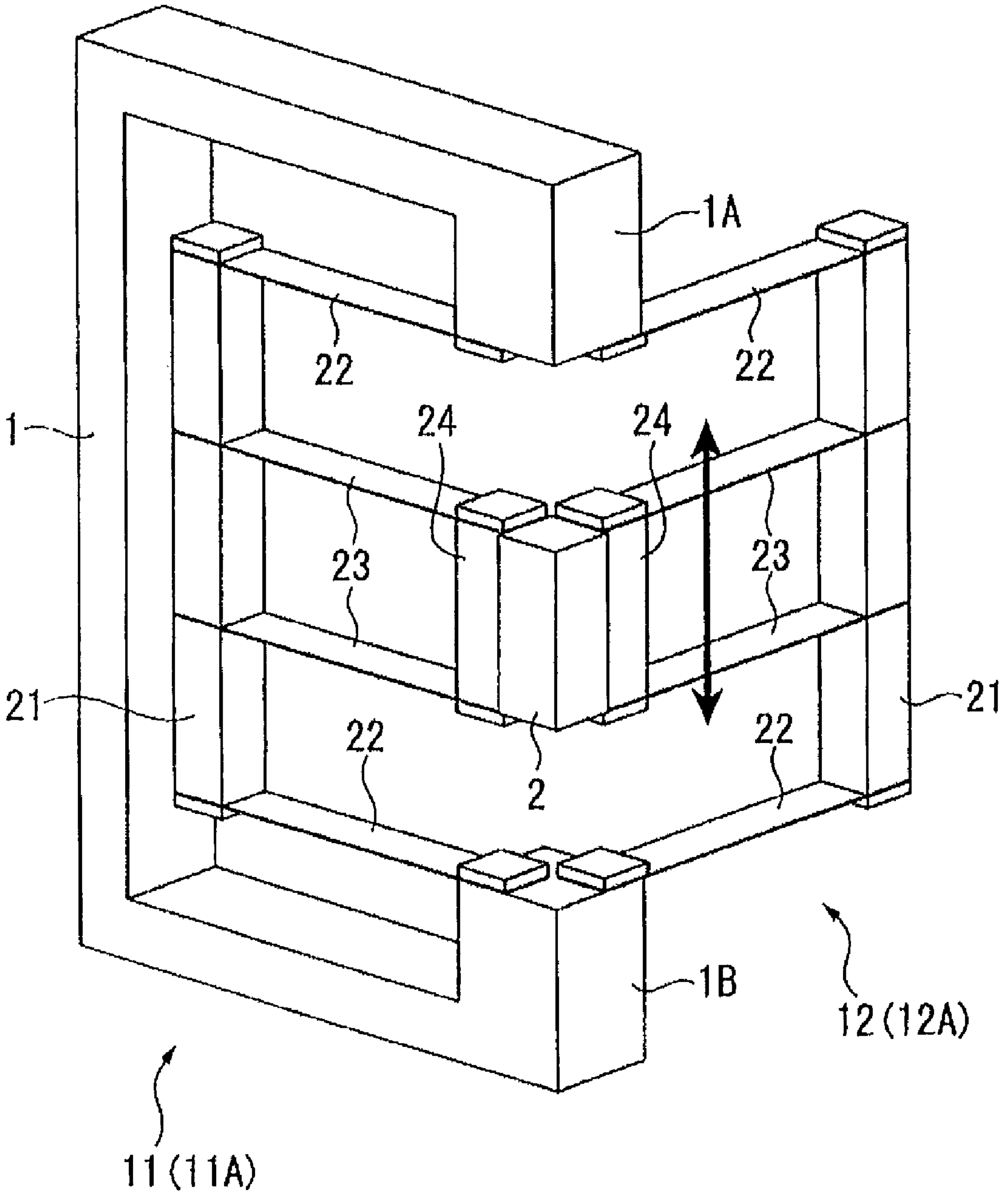
FIG. 1 is a perspective view showing an embodiment of a linear guiding mechanism according to the invention.

FIG. 1 is a perspective view showing a linear guiding mechanism according to a first embodiment of the present invention. The linear guiding mechanism includes a fixed member 1, a moving member 2, a first double parallel spring mechanism 11 and a second double parallel spring mechanism 12. The first and second double parallel spring mechanisms 11, 12 are arranged between the fixed member 1 and the moving member 2 and are configured to movably support the moving member 2.

The fixed member 1 is formed of a C-shaped member in front view, and includes two connecting ends 1A and 1B arranged on an opening side so as to oppose to each other.

The moving member 2 includes a rectangular column-shaped member arranged between the two connecting ends 1A and 1B of the fixed member 1. The moving member 2 defines an axis (axis of movement) that extends through the two connecting ends 1A, 1B of the fixed member.

The first double parallel spring mechanism 11 and the second double parallel spring mechanism 12 are arranged at an angle other than 180° about an axis of movement of the moving member 2. In the illustrated embodiment, the first double parallel spring mechanism 11 and the second double parallel spring mechanism 12 are arranged at an angle of 90° about the axis of movement of the moving member 2, although it is contemplated that other non-90° orientations could likewise be used.

The double parallel spring mechanisms 11 and 12 are configured of double parallel leaf spring mechanisms 11A and 12A each including an intermediate member 21 arranged between the fixed member 1 and the moving member 2, a pair of first leaf springs 22, and a pair of second leaf springs 23. The first leaf springs 22 connect the fixed member 1 and the intermediate member 21 and are arranged so as to be parallel to each other and orthogonal to a direction of movement of the moving member 2. The pair of second leaf springs 23 connect the intermediate member 21 and the moving member 2 and arranged so as to be parallel to each other and orthogonal to the direction of movement of the moving member 2. Further, the first and second leaf springs 22, 23 are configured such that a thickness direction of the first and second leaf springs 22, 23 matches the direction of movement of the moving member 2.

The intermediate member 21 is formed of a rectangular column-shaped member having a length which substantially corresponds to the distance between the two connecting ends 1A and 1B of the fixed member 1.

The pair of first leaf springs 22 extends between and connects the connecting ends 1A and 1B of the fixed member 1 and the ends of the intermediate member 21, and are formed to have substantially the same thickness and length.

The pair of second leaf springs 23 extends between and connects intermediate portions of the intermediate member 21 and the ends of the moving member 2, and are formed to have the substantially same thickness and length. In FIG. 1, although a connecting member 24 is interposed between the pair of second leaf springs 23 and the moving member 2, it is considered apparent that the pair of second leaf springs 23 may be connected directly to the moving member 2 and that the connecting member 24 may be omitted.

In general, the rigidity of the leaf springs 22, 23 are higher in a twisting direction than in a bending direction. When the first double parallel leaf spring mechanism 11A and the second double parallel leaf spring mechanism 12A are arranged at an angle of 90° about the axis of movement of the moving member 2, the bending directions with respect to each other correspond to the twisting directions with respect to each other.

Figure 2:
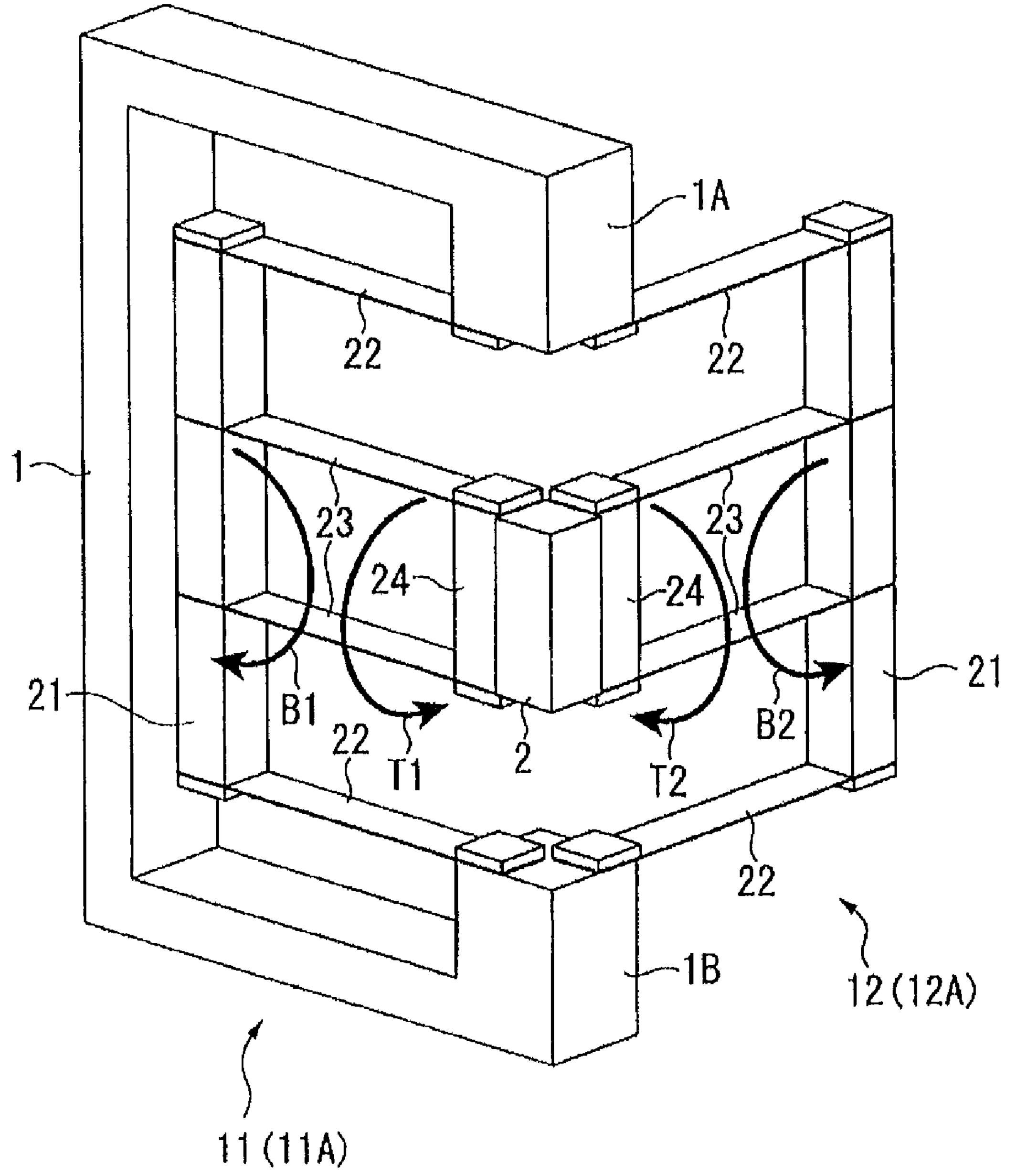
FIG. 2 is a perspective view similar to FIG. 1, and illustrating an action of the linear guiding mechanism.

In other words, as shown in FIG. 2, a bending direction B1 of the first double parallel leaf spring mechanism 11A corresponds to a twisting direction T2 of the second double parallel leaf spring mechanism 12A and, in contrast a bending direction B2 of the second double parallel leaf spring mechanism 12A corresponds to a twisting direction T1 of the first double parallel leaf spring mechanism 11A. Therefore, the rotary movement generated due to the variations in restoring force of the leaf springs is restrained with respect to each other, and hence a desirable linearity is obtained.

A measuring device 30 includes a linear guiding mechanism, as described above, and a movable member linearly moved by the linear guiding mechanism.

As the movable member, any members from among members that constitute the measuring device 30 may be applied as long as it is a movable member, but a member that is required to have linearity. For example, a spindle to which a measured object comes into abutment or a stage on which the measured object is placed is suitable.

Figure 3:
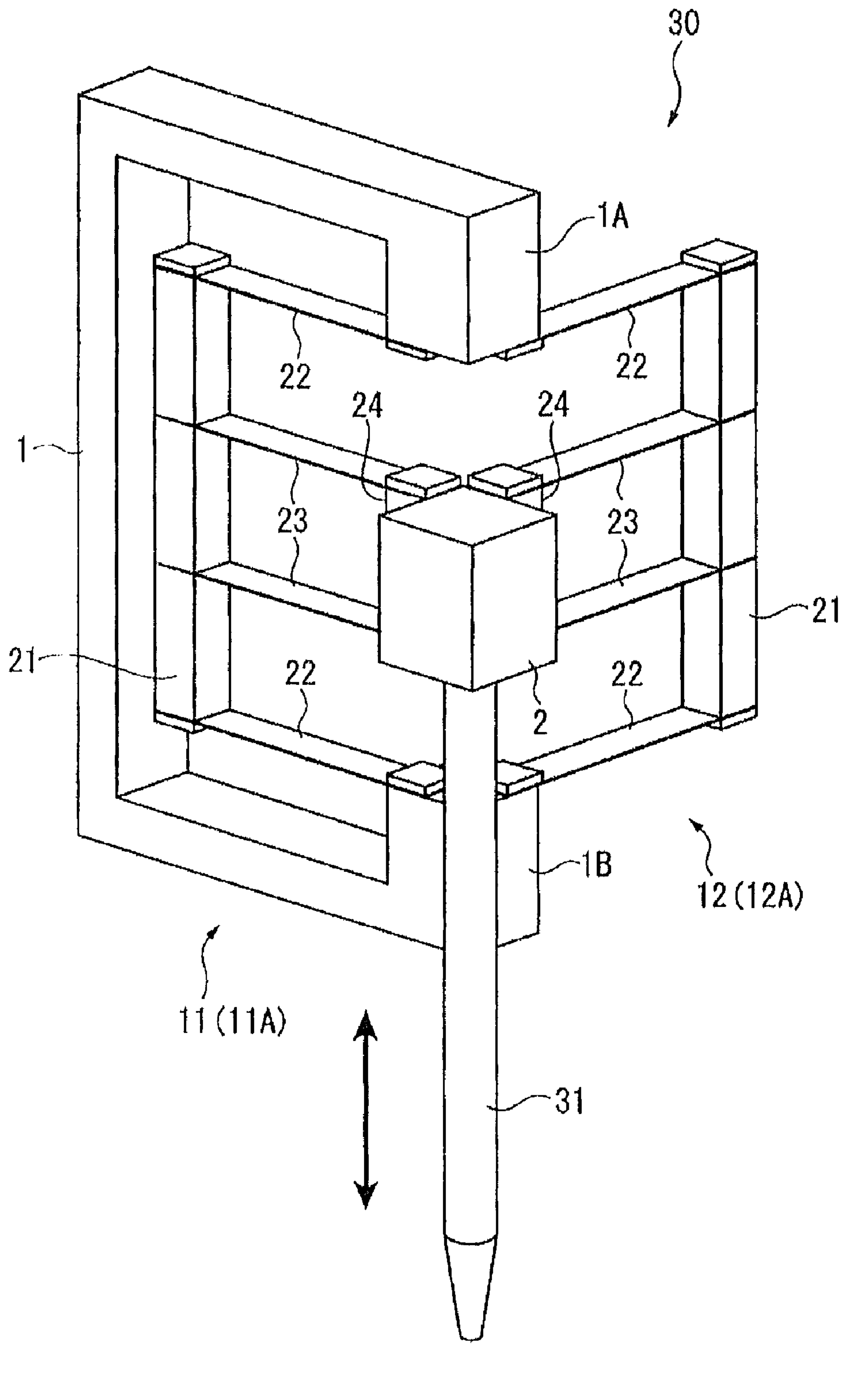
FIG. 3 is a perspective view showing a measuring device (spindle linear guiding mechanism) according to the present invention.

In the measuring device 30 shown in FIG. 3, a probe or spindle 31 extending along the direction of movement of the moving member 2 is mounted on the moving member 2. When the moving member 2 is moved, the spindle 31 is also moved in the same direction and is brought into abutment with the measured object. Dimensions (for example, thickness) of the measured object can be measured by reading a displaced amount of the moving member 2 with a displacement detector (not shown) when the spindle 31 comes into abutment with the measured object.

In other words, the spindle 31 is moved in a state in which a desirable linearity is insured by cooperation of the first double parallel leaf spring mechanism 11A and the second double parallel leaf spring mechanism 12A. Hence, the measuring device with a high degree of accuracy is obtained.

Figure 4:
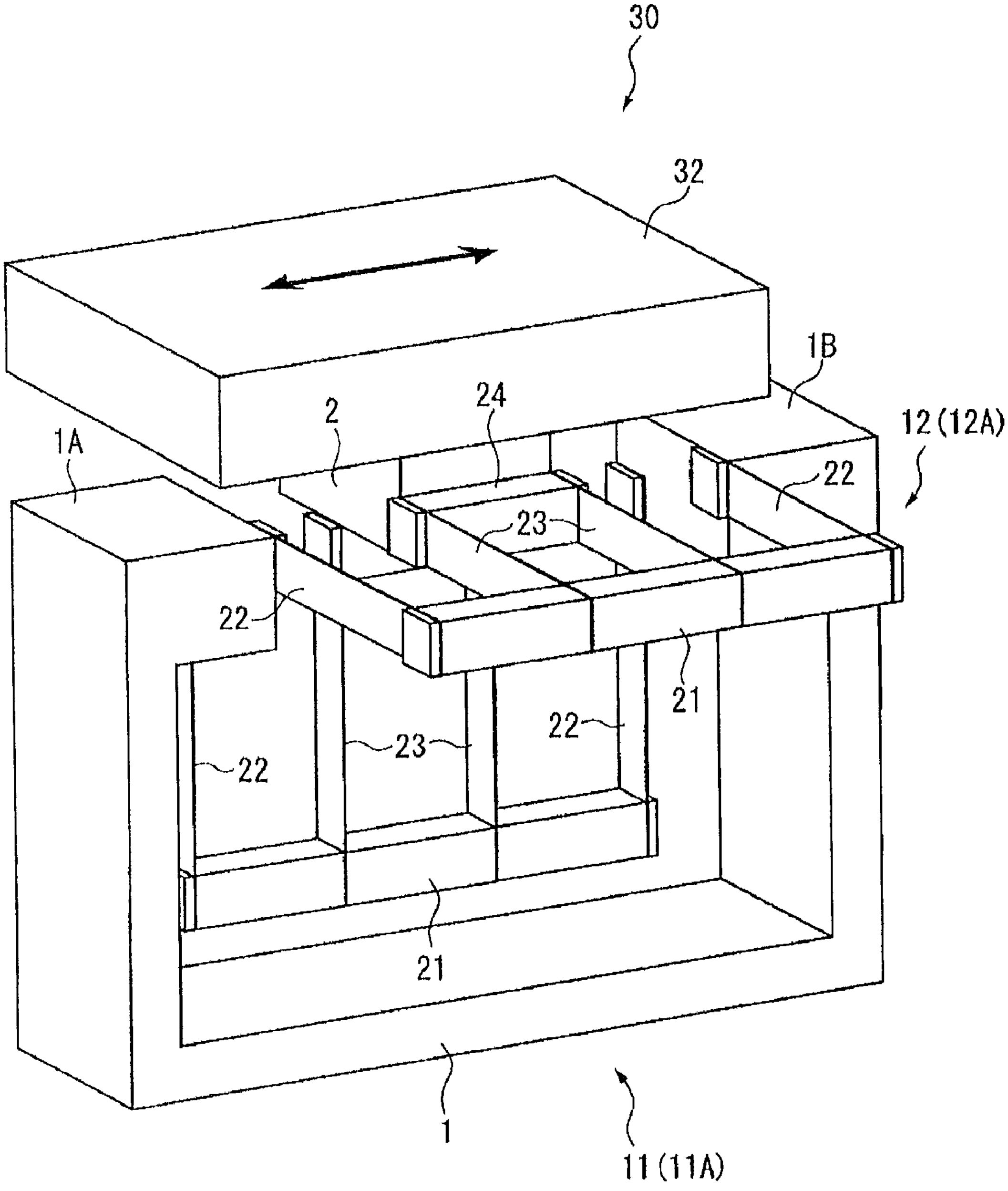
FIG. 4 is a perspective view showing a measuring device (stage linear guiding mechanism) according to the present invention.

In the measuring device 30 shown in FIG. 4, a stage 32 for placing the measured object thereon is mounted on the moving member 2. When the moving member 2 is moved, the stage 32 is also moved in the same direction. Hence, a measuring device with high degree of accuracy can be configured in the same manner, by configuring in such a manner that the amount of displacement of the stage 32 or of the moving member 2 is detected by the displacement detector (not shown).

In the measuring device shown in FIG. 3 and FIG. 4, the moving member 2 may be moved manually. However, it is also contemplated that the moving member may be moved automatically by providing a driving mechanism.

The invention is not limited to the embodiment described above. Rather, in is considered apparent that the present invention is amenable to numerous modifications or improvements without departing from the scope and spirit of the present invention.

Figure 5:
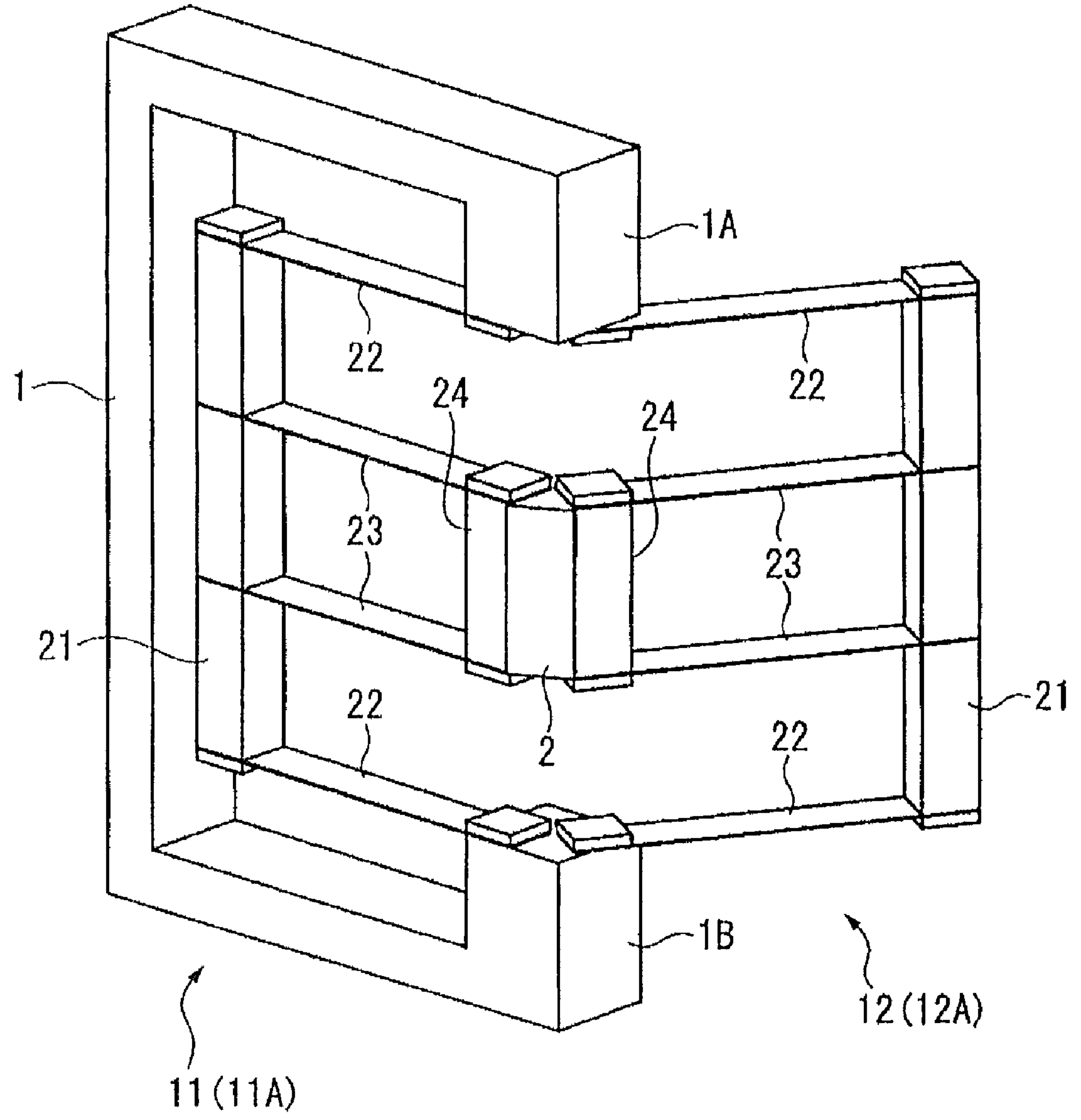
FIG. 5 is a perspective view showing a modification of the linear guiding mechanism according to the present invention.

For example, in the embodiment described above, although the first double parallel leaf spring mechanism 11A and the second double parallel leaf spring mechanism 12A are arranged at an angle of 90° about the axis of movement of the moving member 2, the angle is not limited to 90° as long as it is an angle other than 180° (i.e., a non-180° angle). For example, as shown in FIG. 5, the first double parallel leaf spring mechanism 11A (the first double parallel spring mechanism 11) and the second double parallel leaf spring mechanism 12A (the second double parallel spring mechanism 12) may be arranged at an angle of 135°.

In this configuration as well, for example, if the first double parallel leaf spring mechanism 11A attempts to bend in the bending direction, a twisting force is applied to the second double parallel leaf spring mechanism 12A. The bending of the first double parallel leaf spring mechanism 11A is restrained by the second double parallel leaf spring mechanism 12A and, hence, substantially same effect as in the embodiment described above is expected. Thus, it is possible to arrange the first double parallel leaf spring mechanism and the second double parallel leaf spring mechanism at a non-90° orientation to one another, as may be desirable in certain applications.

Figure 6:
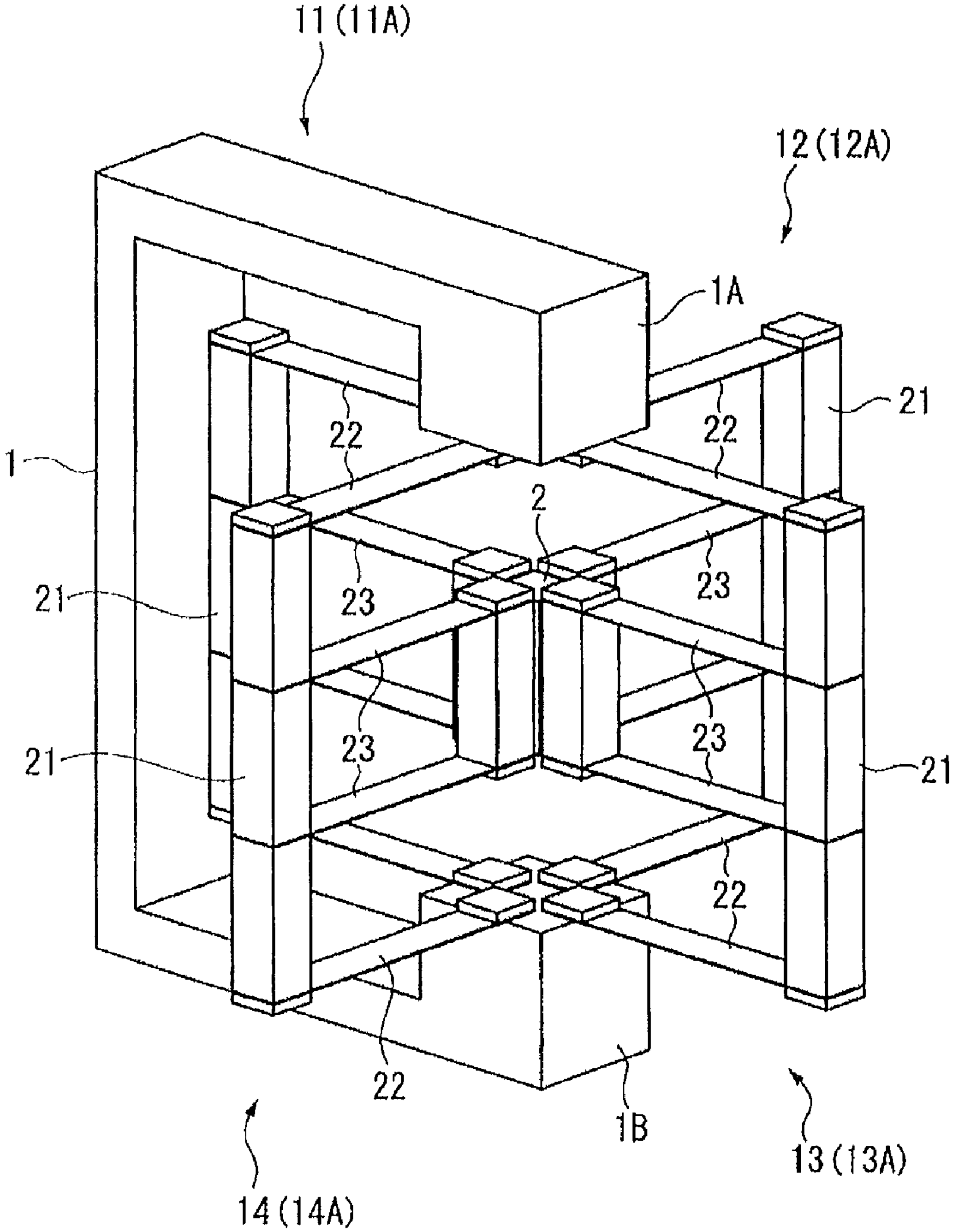
FIG. 6 is a perspective view showing another modification of the linear guiding mechanism according to the present invention.
Figure 7:
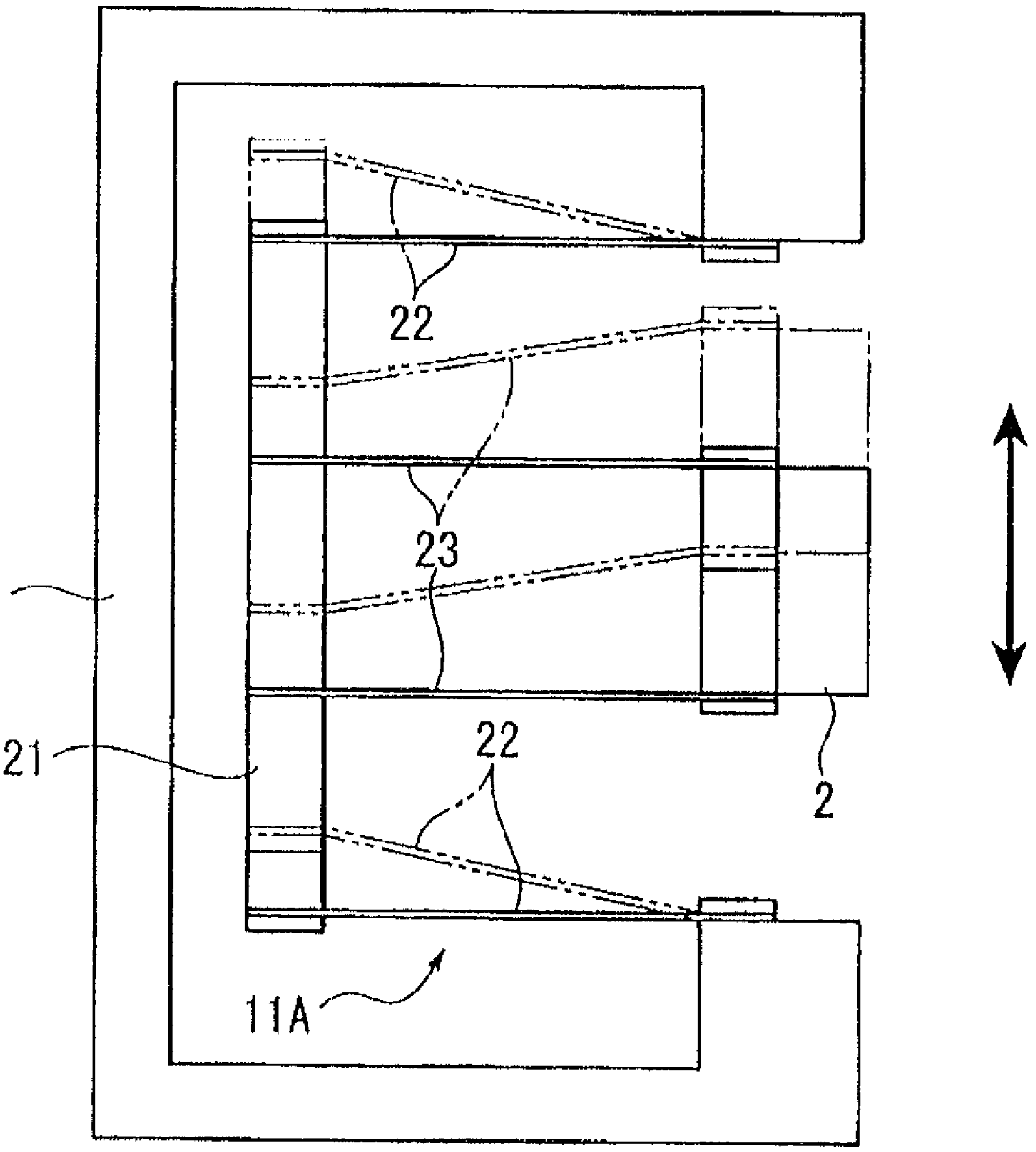
FIG. 7 Prior Art
FIG. 7 is a drawing showing a double parallel leaf spring mechanism in the related art.
Figure 8:
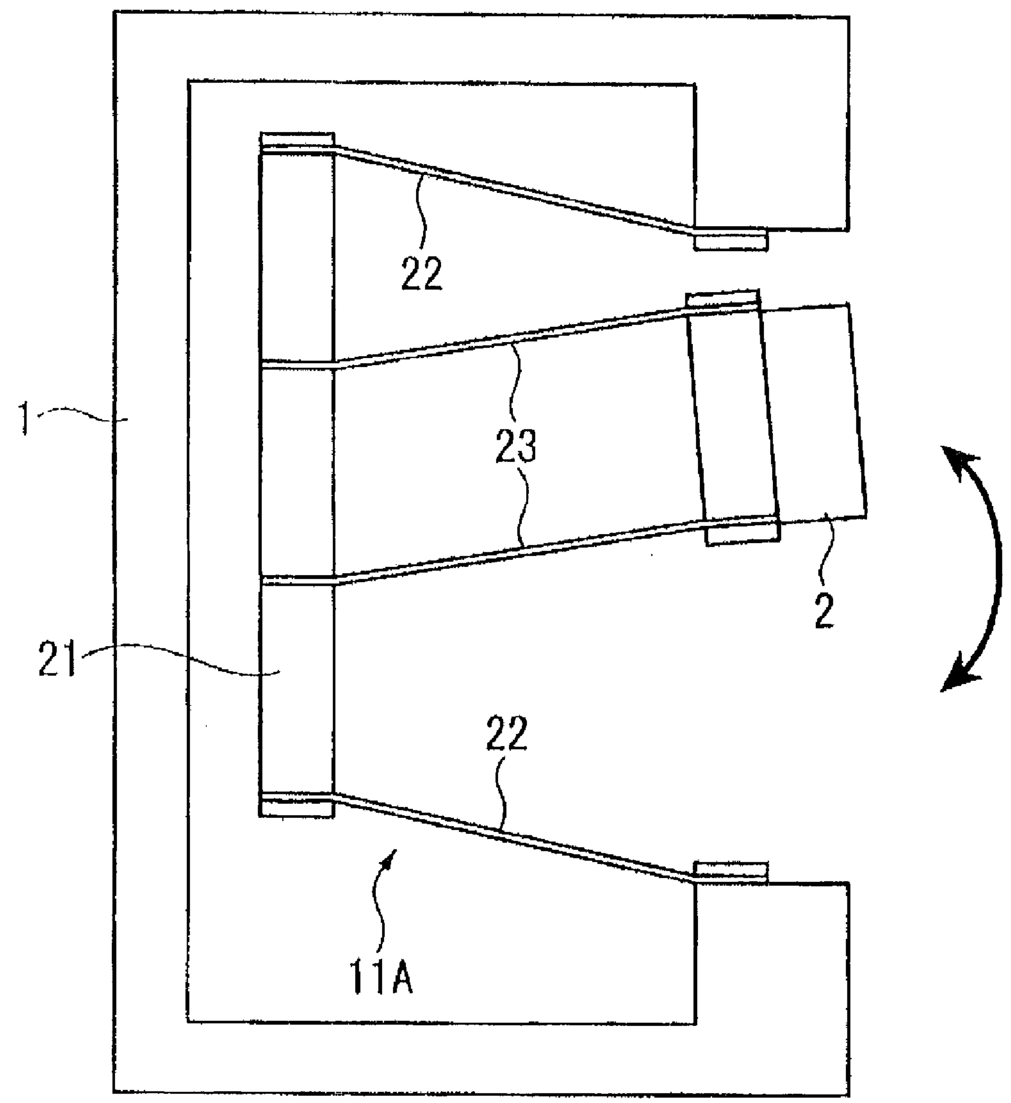
FIG. 8 Prior Art
FIG. 8 is a drawing showing a problem in the double parallel leaf spring mechanism in the related art.

In addition, as shown in FIG. 6, four double parallel leaf spring mechanisms 11A, 12A, 13A, and 14A may be arranged at intervals of 90° about the axis of movement of the moving member 2. In other words, the four double parallel leaf spring mechanisms 11A, 12A, 13A, and 14A (double parallel leaf spring mechanisms 11, 12, 13, and 14) may be arranged in a cross-shape about the axis of movement of the moving member 2.

In this configuration, further enhancement of the rigidity is achieved. Therefore, the invention is suitable for a mechanism which linearly guides the moving member 2, which is a rather heavy object.

In the embodiment illustrated in FIG. 6, the double parallel leaf spring mechanisms 11A, 12A, 13A, and 14A having parallel leaf springs employed therein are used. However the invention is not limited to the leaf springs. For example, a double parallel hinge mechanism in which both ends of a panel member are notched into a thin profile to form hinge portions and the hinge portions are arranged in parallel may also be applicable.

In the embodiment described above, an example in which the linear guiding device is applied to a movable member of the measuring device has been described. However, the invention is not limited to the measuring device. For example, the invention is applicable to any linear guiding mechanisms for industrial machines including machine tools.

The invention may be used for a linear guiding mechanism in which the linearity of the movable member such as a finishing machine is required in addition to the measuring device.

What is claimed is:

1. A linear guiding mechanism comprising:

a fixed member;

a moving member; and a first double parallel spring mechanism and a second double parallel spring mechanism, said first and second double parallel spring mechanisms being arranged between the fixed member and the moving member and being configured to movable support the moving member, wherein the first double parallel spring mechanism and the second double parallel spring mechanism are arranged at a non-180° angle about an axis of movement of the moving member; and wherein the first double parallel spring mechanism and the second double parallel spring mechanism are each configured of a double parallel leaf spring mechanism including an intermediate member, a pair of first leaf springs, and a pair of second leaf springs, said pair of first leaf springs extending between and connecting the fixed member and the intermediate member and being arranged so as to be parallel to each other and orthogonal to a direction of movement of the moving member, said second leaf springs extending between and connecting the intermediate member and the moving member and being arranged so as to be parallel to each other and orthogonal to the direction of movement of the moving member, said first and second leaf springs being arranged such that a thickness direction of the first leaf springs and the second leaf springs match the direction of movement of the moving member and such that each of said first leaf springs is spaced from each of said second leaf springs in a direction of movement of the moving member.

2. The linear guiding mechanism according to claim 1, wherein the first double parallel spring mechanism and the second double parallel spring mechanism are arranged at an angle of 90° about the axis of movement of the moving member.

3. A measuring device comprising:

a linear guiding mechanism comprising:

a fixed member;

a moving member; and a first double parallel spring mechanism and a second double parallel spring mechanism, said first and second double parallel spring mechanisms being arranged between the fixed member and the moving member and being configured to movable support the moving member, wherein the first double parallel spring mechanism and the second double parallel spring mechanism are arranged at a non-180° angle about an axis of movement of the moving member; and wherein the first double parallel spring mechanism and the second double parallel spring mechanism are each configured of a double parallel leaf spring mechanism including an intermediate member, a pair of first leaf springs, and a pair of second leaf springs, said pair of first leaf springs extending between and connecting the fixed member and the intermediate member and being arranged so as to be parallel to each other and orthogonal to a direction of movement of the moving member, said second leaf springs extending between and connecting the intermediate member and the moving member and being arranged so as to be parallel to each other and orthogonal to the direction of movement of the moving member, said first and second leaf springs being arranged such that a thickness direction of the first leaf springs and the second leaf springs match the direction of movement of the moving member and such that each of said first leaf springs is spaced from each of said second leaf springs in a direction of movement of the moving member; and a movable member linearly moved by the linear guiding mechanism.

4. The measuring device according to claim 3, wherein the first double parallel spring mechanism and the second double parallel spring mechanism are arranged at an angle of 90° about the axis of movement of the moving member.

* * * * *